(12) United States Patent
Cazals et al.

(10) Patent No.: US 8,550,400 B2
(45) Date of Patent: Oct. 8, 2013

(54) AIRCRAFT WITH RETRACTED FRONT LANDING GEAR

(75) Inventors: Olivier Cazals, Daux (FR); Jaime Genty de la Sagne, Toulouse (FR)

(73) Assignee: Airbus Operations SAS (FR)

( * ) Notice: Subject to any disclaimer, the term of this patent is extended or adjusted under 35 U.S.C. 154(b) by 657 days.

(21) Appl. No.: 12/494,845

(22) Filed: Jun. 30, 2009

(65) Prior Publication Data

US 2010/0012781 A1   Jan. 21, 2010

(30) Foreign Application Priority Data

Jul. 1, 2008   (FR) ..................................... 08 54460

(51) Int. Cl.
*B64C 1/00* (2006.01)

(52) U.S. Cl.
USPC ................... 244/119; 244/100 R; 244/102 R; 244/120

(58) Field of Classification Search
USPC .............. 244/100 R, 102 R, 117 R, 119, 120, 244/118, 118.5
See application file for complete search history.

(56) References Cited

U.S. PATENT DOCUMENTS

| 2,982,500 | A | * | 5/1961 | Lucien | ...................... 244/102 R |
| 4,674,712 | A | | 6/1987 | Whitener | |
| 6,070,831 | A | | 6/2000 | Vassiliev | |
| 6,213,428 | B1 | * | 4/2001 | Chaumel et al. | .............. 244/119 |
| 2006/0108477 | A1 | | 5/2006 | Helou | |

FOREIGN PATENT DOCUMENTS

| FR | 2906785 A | 4/2008 |
| WO | 2005100155 A | 10/2005 |
| WO | 2008006956 A | 1/2008 |

* cited by examiner

*Primary Examiner* — Timohty D Collins
*Assistant Examiner* — Jamie S Stehle
(74) *Attorney, Agent, or Firm* — Lerner, David, Littenberg, Krumholz & Mentlik, LLP

(57) ABSTRACT

An aircraft has a fuselage of elongated form along a longitudinal axis X corresponding essentially to the longitudinal axis of the aircraft. In a first forward section, the fuselage includes a cockpit in front of a cockpit bulkhead and a front landing gear associated with a landing gear compartment located behind the cockpit bulkhead. The front landing gear and the landing gear compartment are at least partially beneath a floorboard of a compartment of a lower space of the fuselage and in a bulge that increases a volume available for installation of the landing gear.

9 Claims, 3 Drawing Sheets

AIRCRAFT WITH RETRACTED FRONT LANDING GEAR

CROSS-REFERENCE TO RELATED APPLICATIONS

This application claims priority to and the benefit of French Application No. 08 54460 filed on 1 Jul. 2008, the disclosure of which is incorporated by reference in its entirety.

BACKGROUND

The disclosed embodiments relate to the field of aircraft and more particularly the fuselage of transport aircraft.

More precisely, the disclosed embodiments address an aircraft fuselage in which the arrangement of the front landing gear on the forward section is suitable for reducing the portion of the fuselage necessary for the cockpit and for improving the aerodynamic behavior of the fuselage, and that can be adapted for the extreme forward portion of different types of aircraft.

SUMMARY

In the domain of modern transport aircraft design, such as civilian passenger or freight transport aircraft, the forward section of the fuselage 1, as shown in FIG. 1, is usually obtained by the gradual tapering of the forward tip 2 of the fuselage in front of a generally cylindrical section 3.

The transverse cross sections perpendicular to the longitudinal axis 10 of the fuselage 1 are accordingly progressively reduced to a point 21 with zero cross section, corresponding to the front extremity of the fuselage or the nose of the aircraft.

In practice, the cross sections are defined to satisfy certain technical and design constraints.

In the first place, it is necessary to provide for a cockpit 22 in the forward section 2 of the fuselage, located in the upper part above a floorboard 11, whose dimensions are relatively incompressible because of the technical personnel, pilot, copilot, and navigator, who are stationed there during flight, because of the need to provide for transparent areas, windshield and side windows sufficient to assure visibility compatible with standards, and because of the precise arrangement of the flight instruments.

Secondly, the working structure must be interrupted in front at an area with width and height dimensions sufficient to permit the installation of a radar antenna, most often mobile in current systems, that is covered by a protective radome for aerodynamic reasons in the first place, and that also must not obstruct visibility from the cockpit.

Thirdly, a front landing gear 4 must be positioned in a lower section of the front fuselage, and it is stored in a retracted position inside the fuselage 1, more precisely in a landing gear compartment 41 isolating the pressurized volume of the fuselage from the external unpressurized space, with the landing gear compartment closed off by hatches that assure the aerodynamic continuity of the fuselage in the position with retracted landing gear.

The front landing gear is also positioned on the fuselage in an area as far to the front as possible, for reasons of loading the front wheel relative to the principal landing gear located in an area of the aircraft farther to the rear.

Finally, beneath the floorboard 11 of the cockpit 22 and of the cabin 12 for the passengers or for any load, if needed there are equipment compartments 13 in front of cargo compartments 15, the necessary volume of which in practice is adapted by making a compartment more or less long to accommodate installation of all of the necessary equipment, which is of two principal types: technical equipment to monitor the aircraft, to conduct the flight and the mission, and equipment for commercial application to manage the services for the cabin passengers: lighting, temperature control, audio and video systems, meals, toilets, etc. . . .

In practice, paying attention to numerous constraints imposes compromises on the geometry of the forward fuselage and of the front landing gear.

In particular, it is necessary to place the front landing gear in a forward area of the fuselage whose volume is limited, which leads to apportioning the different spaces and interior volumes in a non-optimal manner, in particular with respect to the aerodynamic performance of the fuselage 1 and to the interior arrangement of the cockpit and of the equipment compartments.

These constraints also lead to a front landing gear of relatively great length in order to keep the fuselage essentially horizontal when the aircraft is on the ground, which penalizes its weight, the volume occupied by the landing gear compartment, directly tied to the length of the landing gear, in the forward fuselage, and the aerodynamic drag in the phases of flight with the landing gear extended.

These various drawbacks are sharply mitigated in an aircraft pursuant to the disclosed embodiments that has a fuselage elongated along a longitudinal axis X essentially along a longitudinal axis of the aircraft that determines a direction toward the front along a direction of motion of the aircraft in flight.

Furthermore, the fuselage in a front section has
a cockpit, itself forward of a cockpit bulkhead, and
a front landing gear and an associated landing gear compartment into which the front landing gear is retracted when the gear is in the retracted position, such that the front landing gear and the landing gear compartment are arranged on and in the fuselage behind the cockpit bulkhead.

Advantageously, the space freed up by the retracted position of the front landing gear, for an aircraft in which a floorboard delimits an upper space of the fuselage comprising the cockpit and a cabin behind the cockpit, and a lower space of the fuselage comprising a technical electronics cabinet for technical applications associated with the cockpit, permits limiting the extent of the technical electronics cabinet to a position forward of the cockpit bulkhead, beneath the floorboard.

To limit the impact of the landing gear and of the landing gear compartment on the useful volumes of the fuselage, the front landing gear and the landing gear compartment are entirely or partially located beneath a floorboard of a cargo storage compartment in the lower space of the fuselage and in a section of the fuselage behind the cockpit bulkhead.

Preferably, the front landing gear and the landing gear compartment are in sections located along the longitudinal axis X at the level of an electronics cabinet for commercial applications associated with the cabin or the cargo storage compartment, with the commercial electronics cabinet being located in the lower space of the fuselage between the cockpit bulkhead to the front and the cargo storage compartment to the rear.

To increase the volume available in the lower fuselage in the area for installing the front landing gear and the landing gear compartment, the fuselage in a widening section forward of a rear section, for example with an essentially cylindrical cross section or with a slightly widening cross section, has a bulge located to the rear of the cockpit bulkhead in a lower section of the fuselage, the downward development of which shows a local extreme located lower than a low section of the rear part of the fuselage, with the landing gear compartment being made entirely or partly in the fuselage in the bulge.

To realize industrially a front fuselage section corresponding essentially to the cockpit and that is as independent as possible of the type of aircraft on which the front section can be used, the portion of the fuselage between the nose of the fuselage and essentially the cockpit bulkhead determines a first section of the fuselage. This first section of the fuselage comprises essentially the cockpit and the electronics cabinet for technical applications, and its geometric and structural characteristics are independent of the geometric and structural characteristics of the front landing gear.

Preferably, to produce a fuselage by assembly of sections in a modular fashion, the front landing gear and its landing gear compartment are made in a second section of fuselage that comprises the lower bulge.

This second section is delimited in front by the first section and at the rear by the rear section of the fuselage, so that a fuselage is realized by assembling a first generic section in the front with a second specific section with widening cross section to the rear of the first section, and at least a third rear section to the rear of the second section.

It is also advantageous in an industrial manufacturing process for different types of aircraft that may use common sections for the cockpit, despite having relatively different characteristics in other respects, for example the cross section of the rear fuselage or the structural strength, to make the front section of the fuselage by assembling the second section made as a function of the cross section of the junction and characteristics of the aircraft, depending on the type of aircraft to be produced, and the first section which is essentially independent of the type of aircraft to be produced.

BRIEF DESCRIPTION OF THE DRAWINGS

A detailed embodiment is described with reference to the Figures, which show.

DETAILED DESCRIPTION

Figure 2:
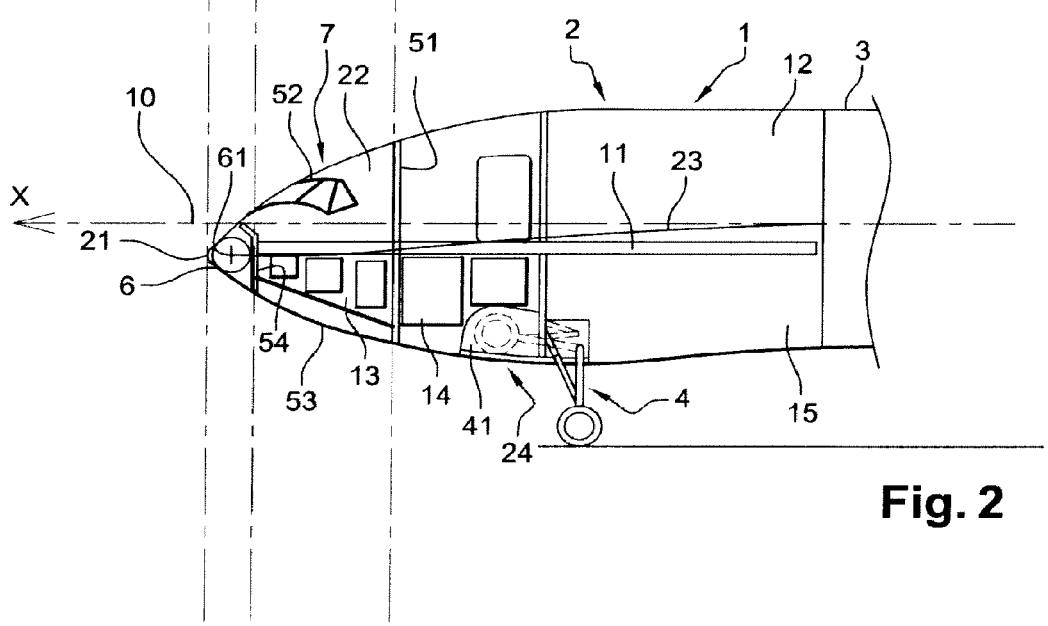
FIG. 2: a schematic view of a cross section of the front fuselage of an aircraft pursuant to the disclosed embodiments.

As shown in FIG. 2, an aircraft fuselage 1 according to the disclosed embodiments comprises a front section 2 relative to the direction of motion of the aircraft in flight, straight sections relative to a longitudinal axis X 10 of the widening fuselage and that connects at a joining section 31 to a rear section 3 that advantageously is essentially cylindrical or whose cross sections are slightly widening relative to the front section 2, said rear section most often being cylindrical with circular cross section or formed of a plurality of lobes, or elliptical, located to the rear of the front section 2 in the case of current transport aircraft.

At the joint between the front section 2 and the rear section 3, the tangents to the surfaces of the fuselage of the front section 2 and the rear section 3 coincide at every point of the cross section of the joint 31 so as not to create joining angles at the exterior surface of the fuselage, which would be prejudicial to the aerodynamic flow in flight.

The axis 10 corresponds essentially in height to the line of greatest width of the rear section 3, for example at mid-height of the fuselage in the case of a cylindrical section with circular cross section.

Figure 1:
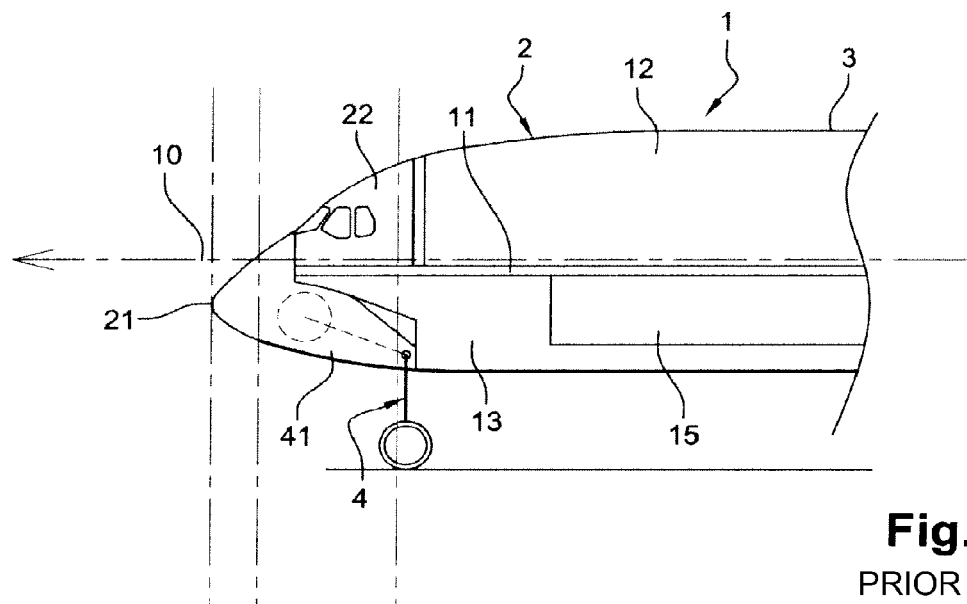
FIG. 1: a schematic view of a cross section of the front fuselage of an aircraft according to the prior art.

The fuselage pursuant to the disclosed embodiments shown in FIG. 2 is represented essentially on the same scale as the fuselage pursuant to the prior art shown in FIG. 1, with similar parts being identified by identical labels on the two fuselages.

In the present description unless otherwise specified, the terms fuselage shape, profile or line of the fuselage, refer to an exterior surface of the fuselage 1, in other words the surface of the fuselage in contact with the aerodynamic flow when the aircraft is in flight.

The front section 2 pursuant to the disclosed embodiments comprises an extreme front part 7 of the fuselage located forward of a longitudinal position along the longitudinal axis X of the fuselage corresponding to a separation, for example at a fuselage bulkhead called the cockpit bulkhead 51, between a forward space devoted to a cockpit 22 and a rear space devoted to a cabin 12 for passengers or for cargo.

Upper shapes of the front section 2 above a floorboard 11 are determined in practice by the dimensions of the cockpit 22, and determine the lines along the longitudinal direction, principally along the longitudinal direction X, supported on a forward base 54, on the cockpit bulkhead 51, and at a joint with the rear section 3 on an upper part of a section 31 of the rear section 3.

The said upper shapes determine an upper profile 52 for the extreme forward section 7 giving rise to a fuselage nose 21 and continuing above the cockpit to rejoin the upper part of the rear section 3 behind the cockpit bulkhead 51.

Preferably, as shown in FIG. 2, the upper profile 52 shows a simple curvature that connects tangentially to the rear section 3 and characterizes a development as regular as possible of the cross sections of the fuselage in its upper part, so as to favor laminar aerodynamic flow characteristics around the fuselage in flight at the greatest longitudinal distance behind the nose 21 of the fuselage.

The position along the longitudinal axis X of the nose 21 of the fuselage relative to the cockpit bulkhead 51 determining the space of the fuselage 1 devoted to the cockpit 22 is itself such that the upper profile 52 permits the installation of a radar antenna 61 in a radome 6 forward of the forward base 54, a constraint that imposes on the fuselage nose 21a position in height along an axis Z of the vertical plane of symmetry of the fuselage.

In the case of a so-called single-bridge fuselage, in other words one that comprises a single floorboard 11 separating an upper cockpit 22 and cabin 12 from a lower storage compartment 14, the nose 21 of the fuselage is located in practice along the Z axis, considering the heights of the cabin and storage compartment spaces below the axis 10 of the rear section 3 of the fuselage located between an upper profile and a lower profile of the said rear section.

Lower shapes of the forward section 2 beneath the floorboard 11, at least forward of the cockpit bulkhead 51, are such that a lower profile 53 of the extreme front section 7 are essentially symmetrical with respect to an axis parallel to the X axis passing through the nose 21 of the fuselage.

This characteristic confers upon the fuselage in its forward section an ovoid shape visible in FIG. 2, which favors laminar aerodynamic flow.

Preferably, a line of greater width of the fuselage 23 between the upper profile 52 and the lower profile 53 tends progressively to rejoin a horizontal plane that comprises the axis 10 of the fuselage, but this tendency is limited in the extreme front section 7.

Because of the essentially symmetrical shape of the upper profile 52 and the lower profile 53 forward of the cockpit bulkhead 51 and the required shape of the upper profile 52, the lower profile 53 rapidly converges toward the cross section of the joint with the rear section 3 to the rear of the cockpit bulkhead 51, and as shown in FIG. 2 for the case of a fuselage 1 whose rear section 3 has a relatively small height along the Z direction between an upper profile and a lower profile of the said rear section, the lower profile 53 of the fuselage in the front section 2 comprises a part below the lower profile of the rear section 3 of the fuselage, with the said section characterizing a lower bulge 24 of the front fuselage.

At the position of the lower bulge 24, the position the farthest from the axis of the fuselage the lower profile 53 corresponds to an intermediate cross section 55 with maximum extension toward the bottom, which determines a local extreme of the lower profile, and the lower profile then shows a simple curvature between the nose 21 of the fuselage and the cockpit bulkhead 51, with the simple curvature extending to beyond the intermediate section 55, and a double curvature between the intermediate section 55 and the joint cross section 31, with the double curvature being necessary to connect the surface of the front section 2 with the rear section 3 without any ridge in a lower section of the fuselage.

As a consequence, the lower profile 53 shows a tangent essentially parallel to the axis 10 of the fuselage in the area of the intermediate cross section 55, a tangent parallel to the tangent of the lower profile of the rear section 3 in the areas of the joining cross section 31, and a curvature inflection point between the intermediate cross section and the joining cross section.

This configuration of the lower profile 53 is reproduced for the profiles of the lower part of the fuselage located between the lower profile and an intermediate profile located between the lower profile and the profile corresponding to the line 23 of the maximum width of the fuselage, corresponding to a profile passing through a point 56 on the intermediate cross section 55 and a point located essentially at the same height of the joint cross section 31, the distances of which from the vertical aircraft plane of symmetry are essentially the same.

Figure 5A:
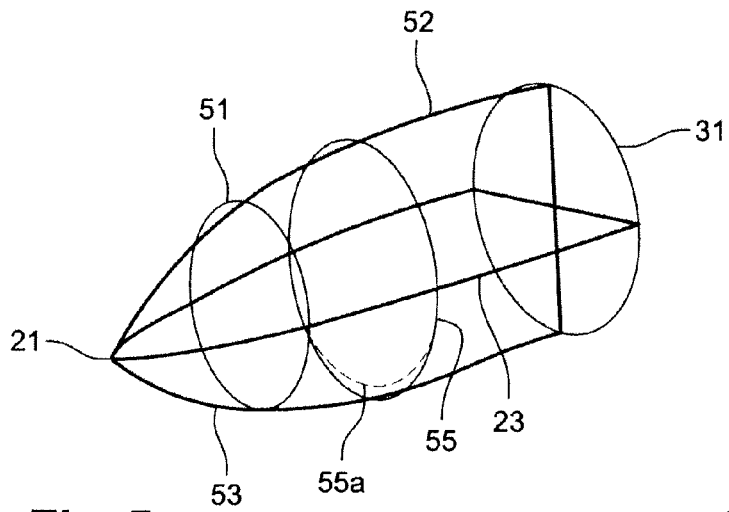
FIGS. 5a and 5b: an illustration of the lines of the front section of the fuselage for different transverse cross sections and along the longitudinal cross sections, in perspective in FIG. 5a and in front view in FIG. 5b.
Figure 5B:
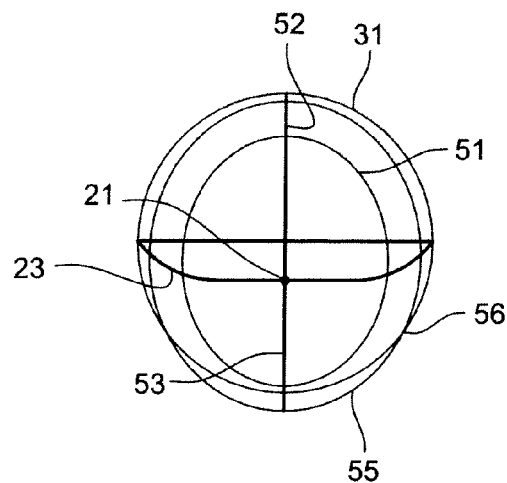
Figure 6:
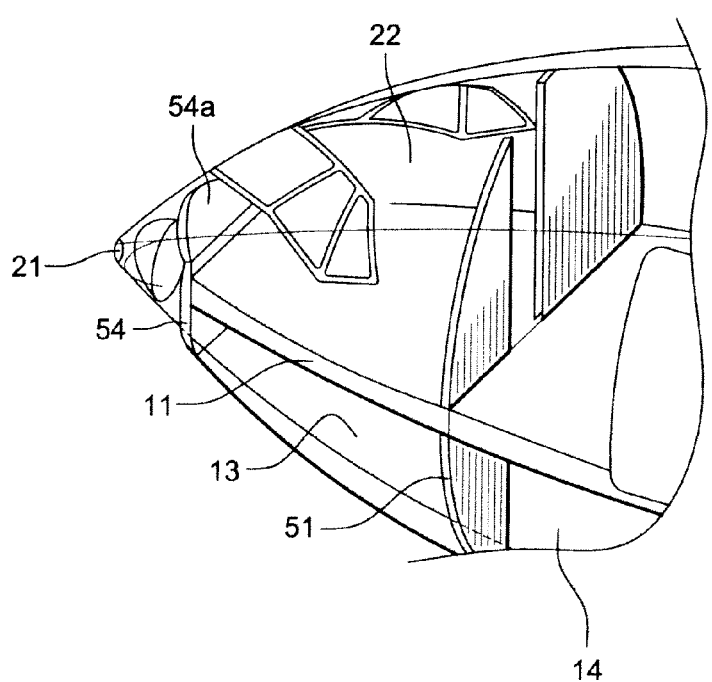
FIG. 6: a perspective view, partly broken away, of the principal elements of the extreme front point.

As shown in FIGS. 5a and 5b, in the area of the cross section 55 with maximum lower extension, the maximum width of the fuselage, illustrated by the line 23 in the area of the said cross section, is essentially the same width as a section not applying the principles of the disclosed embodiments, such as the cross section 55a shown as a broken line in FIG. 5a.

As advantages derived from these shapes of the front fuselage will be understood, it should be understood that the said shapes are obtained by the working structure of the fuselage so that the internal volumes and the structures for absorbing the various stresses to be introduced into the fuselage benefit from the singular shapes of the fuselage pursuant to the disclosed embodiments.

In particular, if such forms were sought by means of aerodynamic streamlining produced on a fuselage structure of conventional shape, the advantages expected from the disclosed embodiments would not be obtained. Thus, the unconventional shape of the forward section of the fuselage according to the disclosed embodiments characterized by such upper and lower profiles is associated beneficially with singular characteristics concerning the structure of the forward section of the fuselage 2, the implanting of a front landing gear 4, and the arrangement of electronics cabinets 13, 14.

According to the proposed arrangement, the front landing gear 4 is placed along the X direction so that the said front landing gear as well as a landing gear compartment 41 are located behind the cockpit bulkhead 51.

The front landing gear 4, retractable a priori, is retracted in the case of the landing gear 41 toward the front, as shown in FIG. 2, or toward the rear, a case not shown, so that the extreme front section 7 of the fuselage forward of the cockpit bulkhead 51 is not affected by the said landing gear or its installation.

This arrangement of the front landing gear 4 has the benefit of transporting the points of uptake of the said front landing gear on the fuselage 1 into an area of the said fuselage closer to the ground when the aircraft is grounded, because of the lower profile 53 more distant from the axis of the fuselage in the area of the bulge 24, and accordingly of permitting a shorter and thus lighter landing gear for equivalent strength.

Actually, if the front landing gear were fastened in an area of the fuselage 3 behind the bulge 24, for example near the joint cross section 31 at which the height of the fuselage is reduced, the necessity of transferring the stresses on the landing gear to the structure of the fuselage would impose a longer strut on the landing gear to maintain the height of the fuselage relative to the ground.

This arrangement of the front landing gear 4 frees up space beneath the floorboard 11 in the extreme front section 7, below the cockpit 22, generally utilized as electronics cabinets.

The position of the landing gear farther to the rear provides a first benefit at this point by totally freeing the volume available for the electronics cabinet forward of the cockpit bulkhead 51, and of making it easier to organize this volume and accordingly to arrange the cockpit and the associated electronics cabinet in a more rational manner.

The distancing of the front landing gear has a second benefit in reducing the level of vibration generally encountered in the front electronics cabinet 13 while taxiing, and of limiting the risk of damage to equipment in case of a flat tire.

Also, because of the bulge 24, the volumes available beneath a floorboard of the cargo compartment 15 are sufficient to integrate the front landing gear 4 in the lines of the fuselage without the necessity of reducing the volume of the said cargo compartment in order to place in the fuselage the landing gear compartment 41, which on the one hand is shorter along the X direction because of a shorter front landing gear, and on the other hand because it penetrates less into the volumes provided in the fuselage because of a lesser inclination of the front landing gear in the position retracted to the interior of the landing gear compartment.

Figure 3:
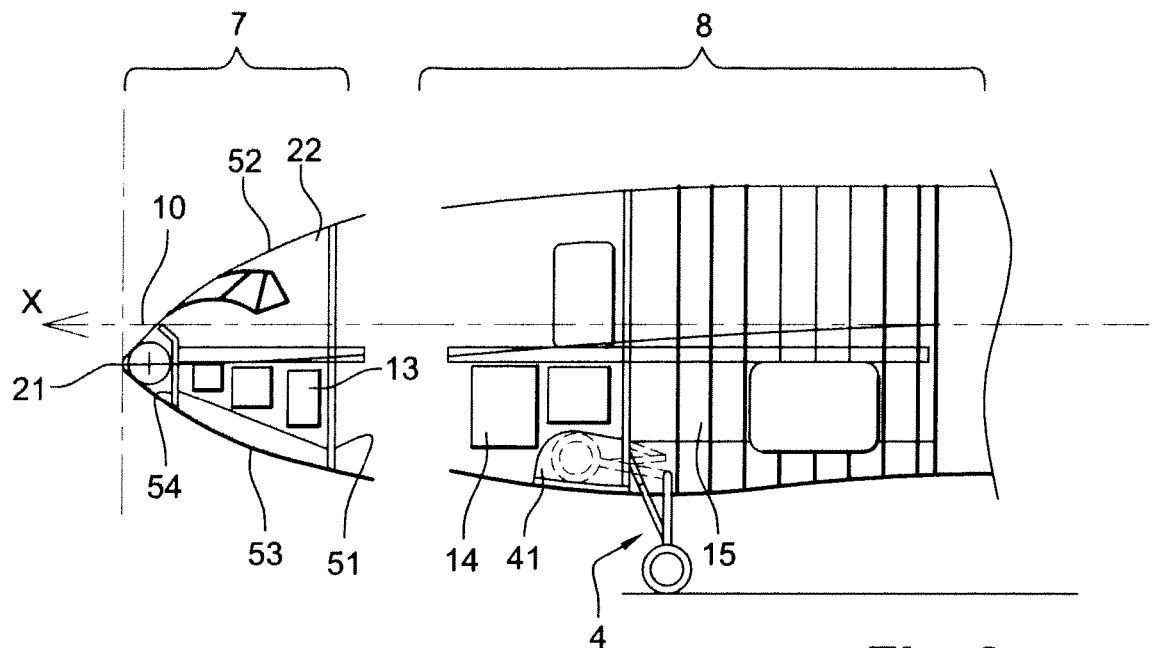
FIG. 3: a schematic view of a cross section of the front fuselage illustrating an extreme front point detached from the front section of the fuselage.
Figure 4:
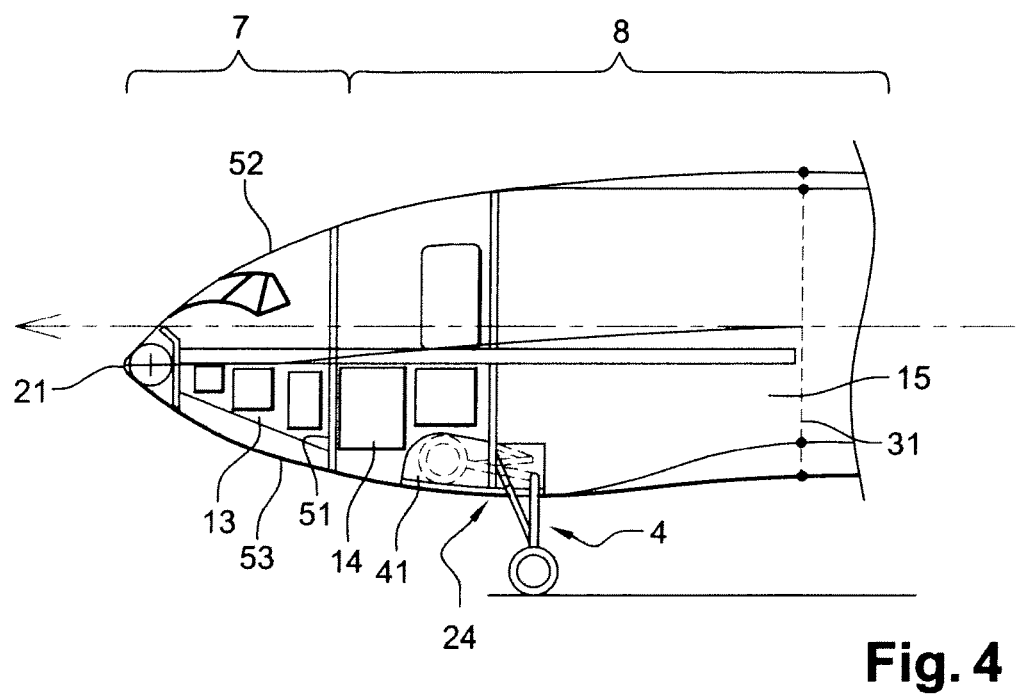
FIG. 4: a schematic view of a cross section of the front fuselage illustrating the joining of the front point to different shapes of fuselage.

The front landing gear 4 is thus partly beneath the cargo compartment 15 and beneath the rear electronics cabinet 14, as shown in FIGS. 2, 3, and 4, or totally beneath the cargo compartment 15, a case not shown.

The forward electronics cabinet 13 combines to the extent possible the various equipment devoted to the technical functions of the aircraft and associated with the cockpit 22.

The shape of the fuselage in the forward section 2 also has the effect of creating a volume for the rear electronics cabinet 14 behind the cockpit bulkhead 51 that is increased in height relative to a lower profile of a conventional fuselage.

According to the fuselage of the disclosed embodiments, this volume of the rear electronics cabinet 14 is used to combine system electronics equipment linked to the cabin space 12, with the increased height of the rear electronics cabinet being advantageously utilized to reduce the length in the longitudinal direction of the said cabinet, and consequently to increase the volume of the cargo compartment 15 for transporting loads of merchandise behind the rear electronics cabinet 14.

Because of the separation of the volumes of electronics cabinets 13, 14, and of the position of the front landing gear 4 made possible by the forward shapes of the fuselage of the disclosed embodiments, it is possible to produce fuselage elements or sections to be assembled in an industrial process to produce a fuselage, facilitating the integration of systems into the structure in the fuselage elements before assembly.

In particular pursuant to the disclosed embodiments, as shown in FIG. 3, a first section of fuselage is formed by the extreme front section 7, in other words entirely or partly the structure and the aircraft systems located essentially in front of the cockpit bulkhead 51.

The said structure and the said systems are associated with the cockpit and with the techniques of piloting and flight management comprising numerous invariants, and which in practice depend little or not at all on the outline of the structure and the installations of the systems of the type of aircraft under consideration, in other words in an industrial manufacturing process for aircraft and in particular families of aircraft comprising different models, the extreme front section has a high level of commonality between different aircraft, which makes the said extreme front section generic to some extent, relative to the aircraft families being considered.

This high level of commonality applies especially to the structural design, because the front landing gear 4, the structure of which depends obviously on the model of aircraft, particularly because of the weight characteristics of the aircraft, is displaced relative to a conventional aircraft into a zone behind the cockpit bulkhead 51 and accordingly does not affect the extreme front section.

This high level of commonality is also not affected by the assembly of identical extreme forward sections 7 with fuselages with different cross sections for connection 31 with the rear section 3 as shown in FIG. 4.

In such cases of different joining cross sections, the shapes of a second section 8 of fuselage corresponding to the front section of the fuselage with tapered cross section located between the cockpit bulkhead 51 and the rear section 3 of the fuselage are adapted to connect to the said rear section of the fuselage, specifically by adapting the upper and lower profiles 52 and 53 as well as the line of greatest width of the fuselage 23, which makes the said second section a section specific for the model of aircraft under consideration.

Such specific second sections 8 with different geometric shapes are also specific in structures and in systems, depending on the model of aircraft because of characteristics of the front landing gear and of configuration of the rear electronics cabinet 14 that are a priori different to meet the different needs for arranging the cabin 12 and the cargo compartment 15.

However, the arrangement of the rear electronics cabinet 14 remains independent of that of the forward electronics cabinet 13.

The shapes of the extreme front section 7, freed of the constraints for integration of the front landing gear, permits the construction of a shorter cockpit without modifying the visibility of the pilots in the cockpit 22, in particular by means of a forward base 54 that has an upper part 54a inclined toward the front, shown in FIGS. 2 to 5, in a high section for the integration of a control instrument panel as far to the front as possible.

Producing a shorter cockpit, in particular made possible by a position of the front landing gear farther to the rear according to the disclosed embodiments, permits the construction of an aircraft with smaller dimensions and less weight with the same missions, or an aircraft with improved missions and the same total weight and dimensions.

In an example of embodiment of an aircraft whose fuselage is about 5 meters in diameter in a cylindrical part with circular cross section, the following benefits have been identified by implementing the disclosed embodiments in comparison with a conventional method:

reduction of the length of the fuselage by about 0.4 m;
reduction of the length of the front landing gear by about 0.4 m;
surface area of pressurized structure of the landing gear compartment of about 30%;
surface area of the closing hatches of the landing gear compartment of about 30%;
with these benefits being realized without reducing the useful volumes of the cockpit and of the compartments.

The disclosed embodiments also permit the production in one manufacturing step of a forward section of fuselage of a model of aircraft adaptable to different cross sections of rear fuselage by assembly on the one hand of a first extreme forward section corresponding to the area of the cockpit that depends relatively little on the model of aircraft, and on the other hand of a second section intermediate between the first section and an intermediate section of fuselage that has particular characteristics dependent on the model of aircraft.

The invention claimed is:

1. An aircraft that has a fuselage elongated along a longitudinal axis X essentially along a longitudinal axis of the aircraft that determines a direction toward the front along a direction of motion of the aircraft in flight, said aircraft comprising in a forward section:
   a cockpit in front of a cockpit bulkhead; and
   a front landing gear and a landing gear compartment associated with said front landing gear, said landing gear and said landing gear compartment being produced on and in the fuselage behind the cockpit bulkhead;
   wherein the landing gear compartment is produced entirely or partly in a bulge of the fuselage, located behind and adjacent the cockpit bulkhead in a lower part of the fuselage, a profile of said bulge having a local downward extreme.

2. The aircraft of claim 1 in which the bulge of the fuselage is obtained by an ovoid shape of an extreme forward tapered section of the fuselage in front of the cockpit bulkhead, in which said ovoid shape a lower profile of said extreme forward section is essentially symmetrical relative to an upper profile relative to an axis parallel to the axis of the fuselage X and passing through a nose of the fuselage.

3. The aircraft of claim 2 in which a floorboard delimits an upper space of the fuselage, comprising the cockpit and a cabin to the rear of said cockpit, and a lower space of the fuselage comprising a technical electronics cabinet devoted to technical applications associated with the cockpit in front of the cockpit bulkhead, beneath the floorboard.

4. The aircraft of claim 3 in which the front landing gear and the landing gear compartment are entirely or partially located beneath a floorboard of a cargo compartment in the lower space of the fuselage and in a section of said fuselage behind the cockpit bulkhead.

5. The aircraft of claim 4 in which the front landing gear and the landing gear compartment are in sections located along the longitudinal axis X at the level of an electronics cabinet for commercial applications associated with the cabin or the cargo storage compartment, with said commercial electronics cabinet being located in the lower space of the fuselage between the cockpit bulkhead to the front and the cargo storage compartment to the rear along the longitudinal axis X.

6. The aircraft of claim 5 in which a portion of the fuselage between a fuselage nose and essentially the cockpit bulkhead determines a first section of fuselage comprising essentially the cockpit and the electronics cabinet devoted to technical applications, with the geometric and structural characteristics of said section being independent of the geometric and structural characteristics of the front landing gear.

7. The aircraft of claim 6 in which the front landing gear and the landing gear compartment are produced in a second section of fuselage, with the second section comprising the bulge, with the second section delimited in the front by the first section and at the rear by a rear section of the fuselage.

8. A method for producing an aircraft fuselage by assembling sections of fuselage, at least a first section delimited forwardly by a nose of the aircraft fuselage and rearwardly essentially by a cockpit bulkhead, at least a second section delimited forwardly by a rear of the first section and rearwardly by a rear section of the fuselage, wherein the first section comprises essentially a cockpit and an electronic cabinet devoted to technical applications, wherein second section comprises a bulge in a lower part of the fuselage and a front landing gear compartment at least partly in the bulge and adjacent to the cockpit bulkhead and an electronic cabinet devoted to commercial applications and wherein the second section is selected between a plurality of models having a same forward joining cross section fitting with the first section and different rear joining cross sections to fit with different models of rear section of fuselage, the second section being selected to fit to the rear section of the fuselage to be produced.

9. The aircraft of claim 1, wherein the local downward extreme is along a generally vertical axis intersecting with the longitudinal axis of the aircraft.

* * * * *